United States Patent
Shirai (10) Patent No.: US 7,660,002 B2
(45) Date of Patent: Feb. 9, 2010

(54) IMAGE FORMING SYSTEM, METHOD OF DISPLAYING VARIOUS KINDS OF INFORMATION OF IMAGE FORMING APPARATUS, AND PROGRAM FOR DISPLAYING VARIOUS KINDS OF INFORMATION OF IMAGE FORMING APPARATUS

(75) Inventor: Takuya Shirai, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 386 days.

(21) Appl. No.: 11/292,220

(22) Filed: Nov. 30, 2005

(65) Prior Publication Data

US 2006/0146364 A1 Jul. 6, 2006

(30) Foreign Application Priority Data

Nov. 30, 2004 (JP) ............... 2004-346942

(51) Int. Cl.
G06F 15/00 (2006.01)
G06F 3/12 (2006.01)
G06K 1/00 (2006.01)

(52) U.S. Cl. ..................... 358/1.13; 358/1.15
(58) Field of Classification Search ............ 358/1.15, 358/1.13, 1.14, 1.1, 1.9; 715/207, 234, 740
See application file for complete search history.

(56) References Cited

U.S. PATENT DOCUMENTS

| | | | | |
|---|---|---|---|---|
| 6,442,577 | B1 * | 8/2002 | Britton et al. | 715/230 |
| 7,234,107 | B1 * | 6/2007 | Aoki et al. | 715/207 |
| 7,487,444 | B2 * | 2/2009 | Lira | 715/247 |
| 2005/0237564 | A1 * | 10/2005 | Sugimoto | 358/1.15 |

FOREIGN PATENT DOCUMENTS

JP 2003-248730 9/2003

* cited by examiner

Primary Examiner—Douglas Q Tran
(74) Attorney, Agent, or Firm—Hogan & Hartson LLP

(57) ABSTRACT

There is provided an image forming system in which each user can arbitrarily change an information display page for referring to various kinds of information of an image forming apparatus by a user's terminal unit connected to a network. An image forming apparatus 10, in which various kinds of information relating to the operation of an image forming apparatus can be referred to and set by a terminal unit 410 connected to the image forming apparatus through a network 300, is constructed in such a way that an information display page (my page) 230 specific to a user, in which each information item selected by the user is displayed at each specified position, is displayed as an information display page 210 expressing various kinds of information on the screen of the terminal unit.

6 Claims, 8 Drawing Sheets

IMAGE FORMING SYSTEM, METHOD OF DISPLAYING VARIOUS KINDS OF INFORMATION OF IMAGE FORMING APPARATUS, AND PROGRAM FOR DISPLAYING VARIOUS KINDS OF INFORMATION OF IMAGE FORMING APPARATUS

BACKGROUND OF THE INVENTION

1. Field of the Invention

The present invention relates to an image forming apparatus connected to a terminal unit through a network such as a copier, a printer, and a facsimile machine, and in particular, to an information display page for referring to and setting various kinds of information in a terminal unit.

2. Description of the Related Art

Conventional image forming apparatuses such as for example a copier, a printer, and a facsimile machine include an image forming apparatus which is connected to a network and whose operating state and set information can be referred to by a terminal unit such as a personal computer or the like similarly connected to the network and on which a setting can be further changed by the terminal unit.

Here, an image forming apparatus of today has a very large number of functions and can perform sending and receiving a mail and sending facsimile through a network connection as well as printing.

Therefore, the set information of the image forming apparatus includes not only the setting of various kinds of items of a printer driver in a conventional printer but also various settings such as the setting of connecting the network, the setting of POP3 and SMTP for sending and receiving a mail, and the setting of connecting the facsimile.

Accordingly, for example, in the case of referring to this set information by the above-mentioned terminal unit, information display pages relating to this set information are classified for each category and are displayed as different pages for each category.

Furthermore, to display many categories efficiently, the information display pages corresponding to each category are generally constructed in a hierarchical structure.

Therefore, for example, in the case of referring to set information in an information display page of one category and then referring to set information in an information display page of a different category, it is necessary to once access to an information display page of a category of a higher level and then to move to an information display page of a desired category, which makes operation complicated.

On the other hands, according to Japanese Patent Application Laid-open (JP-A) No. 2003-248730, there is disclosed a content reuse processing system for customizing an information display page relating to the above-mentioned set information.

However, in the content reuse processing system according to JP-A No. 2003-248730, an information display page is customized by a designer of a product and a user cannot customize the information display page after the product is completed. Therefore, it is impossible, for example, for an individual customer to select set information that the user often uses and to customize the information display page.

SUMMARY OF THE INVENTION

The present invention has been made to solve the above problem. The object of the present invention is to provide an image forming system in which each user can arbitrarily change an information display page for referring to various kinds of information of an image forming apparatus by a user's terminal unit connected to a network, a method of displaying various kinds of information of an image forming apparatus, and a program for displaying various kinds of information of an image firming apparatus.

To achieve this object, an image forming system according to an aspect of the present invention is an image forming system capable of referring to and setting various kinds of information relating to an operation of an image forming apparatus by a terminal unit connected to the image forming apparatus through a network, and is constructed in such a way that an information display page (my page) specific to a user, in which an information item selected by the user is displayed at a specified position, is displayed as an information display page expressing the various kinds of information on a screen of the terminal unit.

In this arrangement of the image forming system, the user can set my page specific to the user by registering information items, which the user often refers to and changes a setting of, in my page. Therefore, by calling my page with the terminal unit, the user can refer to various kinds of information set in my page by my page information transmitted from the image forming apparatus through the network. Accordingly, the user can refer to the various kinds of information set in my page on one screen without moving between information display pages for each category. Operation of a user thus becomes easily and simple.

Moreover, an image forming system according to another aspect of the invention is constructed in such a way that a format including respective information items relating to my page information for constructing the above-mentioned my page and their display positions can be arbitrarily changed by the terminal unit.

In this arrangement of the image forming system, the user can arbitrarily change a setting of the screen construction of my page by the user's terminal unit and hence can customize the screen construction specific to the user.

Furthermore, an image forming system according to yet another aspect of the present invention is constructed in such a way that a setting can be changed by the terminal unit in at least one information item of the respective information items of the above-mentioned my page.

In this arrangement of the image forming system, the user can easily change a setting of a desired information item from my page displayed on the terminal unit.

Still furthermore, an image forming system according to yet another aspect of the present invention is constructed in such a way that individual pieces of various kinds of information relating to an operation of the image forming apparatus are given IDs, that the above-mentioned my page information is constructed of a template having IDs corresponding to respective information items built therein and data as set values corresponding to the respective IDs, that when the my page is called from the terminal unit, a control unit of the image forming apparatus converts the respective IDs of the above-mentioned template to corresponding character information and transmits the converted character information and data corresponding to the respective IDs as my page information to the terminal unit through the network.

In this arrangement of the image forming system, by giving various kinds of information items IDs, the amount of information of my page information can be made as little as possible. Therefore the capacity of a storage for storing the my page information can be decreased and the amount of data when the my page information is sent and received through the network can be decreased.

Still furthermore, an image forming system according to yet another aspect of the present invention is constructed in such a way that when a setting is changed in an information item and an ID corresponding to an information item having a setting changed thereof and a set value thereof are transmitted from the above-mentioned terminal unit to the image forming apparatus through the network, the control unit changes a setting of a corresponding piece of various kinds of information based on this set value.

In this arrangement of the image forming system, by transmitting only the ID corresponding to the information item having a setting changed thereof and the set value thereof from the terminal unit to the image forming apparatus through the network, a setting can be desirably changed by a small amount of data transmission.

Still furthermore, an image forming system according to yet another aspect of the present invention is constructed in such a way that the format of the above-mentioned my page information is a format for a browser such as an HTML and an XML.

In this arrangement of the image forming system, my page information can be easily displayed on the screen on the terminal unit side by the use of an already installed browser. Therefore, it is not necessary to install specifically designed software or the like.

Still furthermore, an image forming system according to yet another aspect of the present invention is constructed in such a way that the format of the above-mentioned my page information is registered in the image forming apparatus side.

In this arrangement of the image forming system, only by transmitting an instruction of calling my page from the terminal unit by the user, my page information exclusive to the user is transmitted from the image forming apparatus.

Still furthermore, an image forming system according to yet another aspect of the present invention is constructed in such a way that the format of the my page information is not registered in the image forming apparatus side but the control unit converts respective IDs to character information corresponding to the IDs based on set information of the my page transmitted from the terminal unit when my page is called and transmits the converted character information and data corresponding to the respective IDs as my page information to the terminal unit through the network.

In this arrangement of the image forming system, the image forming apparatus side does not need to register the my page information of each user and hence can effectively use the limited capacity of the memory.

Still furthermore, an image forming system according to yet another aspect of the present invention is constructed in such a way that the control unit makes my page information based on cookie information relating to the set items of the my page information made when the my page is set.

In this arrangement of the image forming system, the cookie information relating to the set items of my page information is stored in the terminal unit of each user and hence each user can refer to my page displayed on the terminal unit based on this cookie information as if my page information is stored in the image forming apparatus side.

Still furthermore, a method of displaying various kinds of information of an image forming apparatus according to yet another aspect of the present invention is a method by which various kinds of information relating to the operation of the image forming apparatus can be referred to and set by a terminal unit connected to the image forming apparatus through a network, and includes the step of making my page information relating to an information display page (my page) specific to a user, in which an information item selected by the user is displayed at a specified position, as an information display page expressing the various kinds of information, the step of transmitting the my page information to the terminal unit of the user through the network, and the step of displaying the my page information on a display part of the terminal unit by the terminal unit.

In this manner, the present invention can be realized also as a method.

Still furthermore, a program for displaying various kinds of information of an image forming apparatus according to yet another aspect of the present invention is a program for causing a computer to perform processing of referring to and setting various kinds of information relating to the operation of the image forming apparatus by a terminal unit connected to the image forming apparatus through a network, and includes the procedure of making my page information relating to an information display page (my page) specific to a user, in which an information item selected by the user is displayed at a specified position, as an information display page expressing the various kinds of information, the procedure of transmitting the my page information to the terminal unit of the user through the network, and the procedure of displaying the my page information on a display part of the terminal unit by the terminal unit.

In this manner, the present invention can be realized also as a program.

In this manner, according to the present invention, by displaying my page on the screen of the terminal unit based on my page information transmitted from the image forming apparatus through the network, the user can refer to each information item set in my page and, as required, can change a setting of the information item. In this arrangement, the user can refer to and change a setting of each information item set in my page on one screen without moving between the information display pages for each category. Therefore, this can simplify the operations of referring to and changing a setting of each information item.

DETAILED DESCRIPTION OF THE PREFERRED EMBODIMENTS

First Embodiment

Hereinafter, a first embodiment of an image forming system and a method of displaying various kinds of information of an image forming apparatus of the present invention will be described with reference to FIG. 1.

Figure 1:
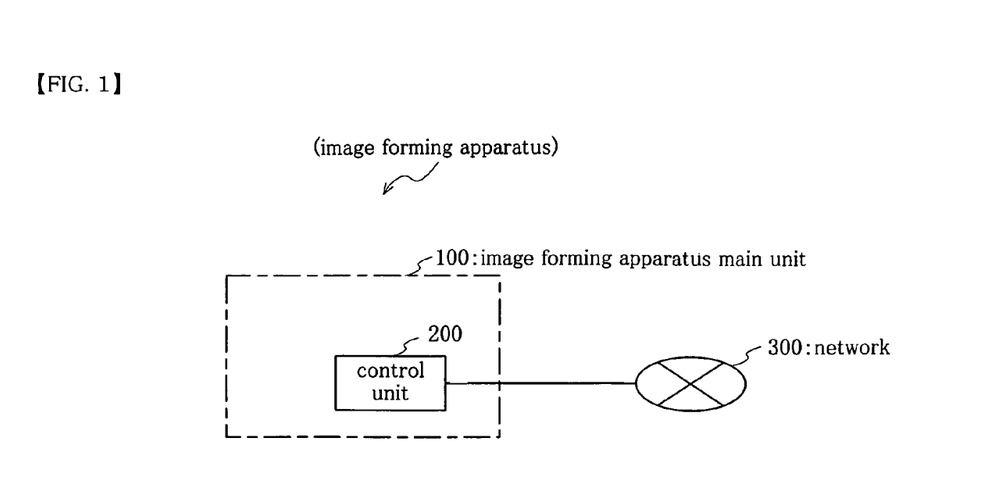
FIG. 1 is a diagram showing the construction of a first embodiment of an image forming apparatus according to the present invention.

FIG. 1 shows the construction of an image forming apparatus provided in an image forming system according to the present invention.

As shown in FIG. 1, an image forming apparatus 10 is constructed of an image forming apparatus main unit 100 and a control unit 200.

The image forming apparatus main unit 100 is constructed in publicly known manner and is so constructed as to be provided with, for example, a printer function, a facsimile function, a mail sending/receiving function, and the like.

Figure 2:
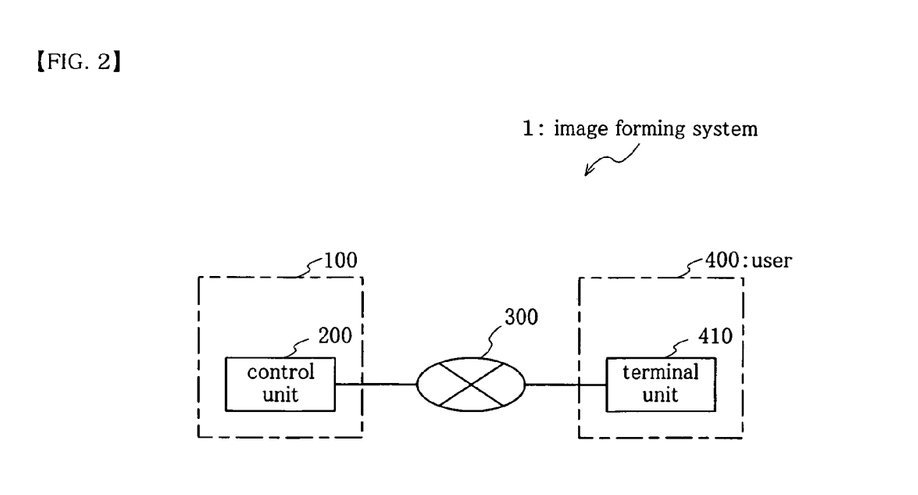
FIG. 2 is a block diagram showing the construction of an image forming system.

The control unit 200 is built in, for example, the above-mentioned main body 100 of the mage forming apparatus 10 and, as shown in FIG. 2, is connected to a network 300 and is connected to a terminal unit 410 of a user 400 through this network 300.

Here, only one user 400 and one terminal unit 410 are shown in the case shown in the drawing. However, actually, terminal units 410 of a plurality of users 400 are connected to the control unit 200 through the network.

Then, an image forming system 1 of the present embodiment is constructed of the image forming apparatus (the image forming apparatus main unit 100), the terminal unit 410, and the network 300.

Here, the control unit 200 reads or sets/changes a setting of various kinds of information relating to the operation of the image forming apparatus main unit 100.

At this time, the control unit 200 gives each of these various kinds of information an ID and registers and manages the ID and a set value in connection with each other. When the control unit 200 refers to and sets these various kinds of information, the control unit 200 refers to and sets each of the various kinds of information and its set value based on the ID and makes an information display page for referring to and setting the various kinds of information, for example, in an HTML format and transmits it to the terminal unit 410 of the user 400 through the network 300.

In this arrangement, the terminal unit 410 refers to this information display page by a previously installed browser and can instruct the control unit 200 to change setting of the specified information items.

In this regard, the above-mentioned information display page is an information display page made for each category arranged in the same hierarchical structure as a conventional structure.

Figure 3:
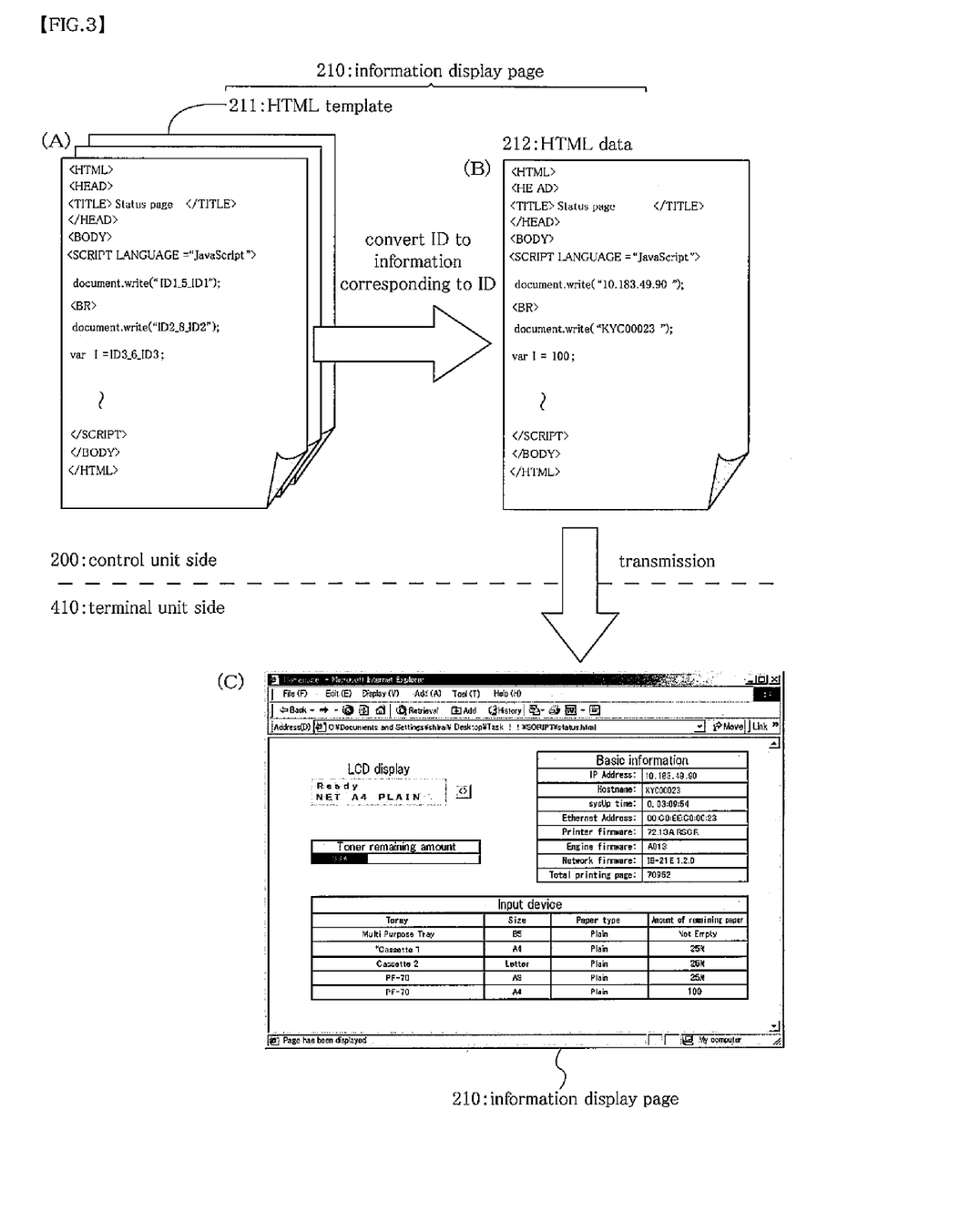
FIG. 3 is a diagram showing a method of displaying an information item by an ID in the image forming apparatus in FIG. 1.

Specifically, when the control unit 200 displays the information display page, as shown in FIG. 3A, the control unit 200 makes an HTML template 211 in which information, individual pieces of which are respectively given IDs, are described and makes HTML data 212, in which the respective IDs are replaced with individual pieces of information as shown in FIG. 3B, in response to a call from the terminal unit 410 and transmits the HTML data 212 to the terminal unit 410.

In this arrangement, in the terminal unit 410, as shown in FIG. 3C, a specified information display page 210 is displayed on a screen based on the HTML data 212 by the browser.

Figure 4:
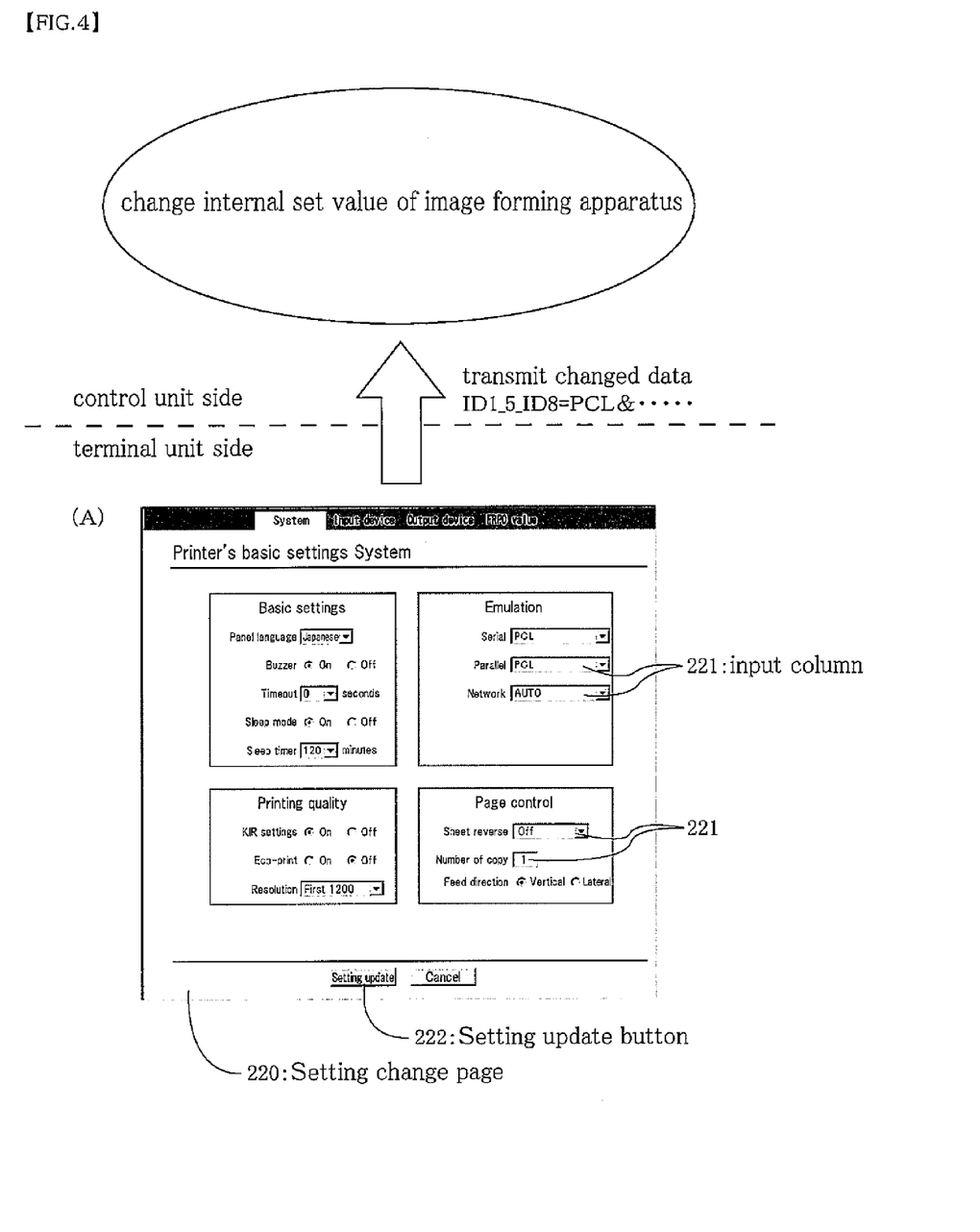
FIG. 4 is a diagram showing a method for setting an information item by an ID in the image forming apparatus in FIG. 1.

Moreover, when the user changes a setting the information item, as shown in FIG. 4A, the user causes the terminal unit 410 to display a setting change page 220 transmitted from the control unit 200 on the screen and inputs a desired set value in the set value input column 221 of each setting item and clicks a setting update button 222. And then, the terminal unit 410 transmits an ID and a set value corresponding to the information item of each set value input column 221 to the control unit 200 of the image forming apparatus 10 through the network 300.

When the control unit 200 receives these ID and set value, the control unit 200 changes a set value corresponding to an already set ID based on these ID and set value to thereby update and register the set value.

Furthermore, in addition to the information display page 210, the control unit 200 sets an information display page 230 specific to the user (hereinafter referred to as "my page") for each user 400 based on set information transmitted from the terminal unit 410 and transmits information (my page information) 231 relating to this my page in response to a call from the terminal unit 410 through the network 300.

In this arrangement, each user 400 can refer to and set only desired information item by my page 230 displayed on his own terminal unit 410.

In addition, in the above-mentioned my page 230, setting changes can be made on the information items that can be set among the displayed information items.

Figure 5:
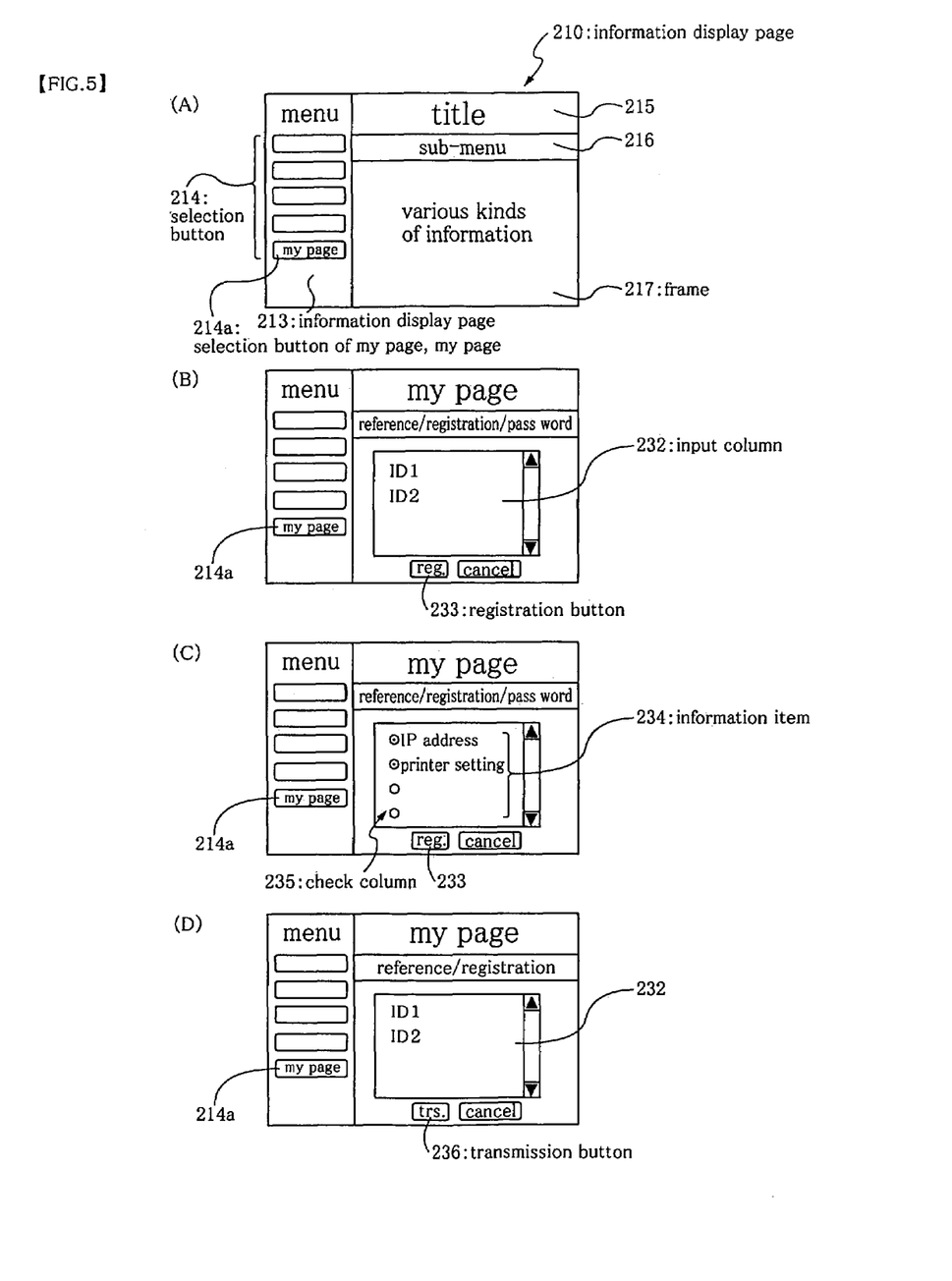
FIGS. 5A to 5D are schematic views of a display screen of my page, a setting and registration screen of my page, a modification of the setting and registration screen of my page, and another modification of the setting and registration screen of my page in the image forming apparatus in FIG. 1, respectively.

Here, the above-mentioned information display page 210, setting change page 220, and my page 230 are built in one menu. As shown in FIG. 5A, selection buttons 214 of respective categories and my page are arranged in a frame 213 at the left end of the screen of a format of the information display page 210, and a selected category title 215 is arranged at the upper right end, and a sub-menu name 216 is arranged below the category title 215, and a reference screen and a setting/registration screen of my page 230 is arranged in a frame 217 below the sub-menu name 216, as shown in FIGS. 5A to 5C.

Then, by using the sub-menu, for example, various kinds of information items arranged in the hierarchical structure for each category can be selectively displayed on the screen.

Therefore, by clicking the selection button 214a of may page in the frame 213 at the left end, an instruction of calling my page is transmitted from the terminal unit 410 to the control unit 200 through the network 300 and the control unit 200 transmits my page information 231 to the terminal unit 410 through the network 300 based on this instruction.

Here, as shown in FIG. 5A, on the reference screen of my page 230 is displayed the set value (not shown) of the previously set information item.

Then, as shown in FIG. 5B, by inputting an ID corresponding to a desired information item to an input column 232 of the setting and registration screen of my page 230 and by clicking a registration button 233, the specified ID is transmitted to the control unit 200 through the network 300. Thus, the control unit 200 registers the ID as my page information 231 in the memory in connection with the user 400. That is, in this case, my page information 231 is registered in the memory (not shown) included in the control unit 200.

In this regard, when the user 400 is connected to the network 300, the user 400 is uniquely identified by log-in or the like and hence the ID can be easily connected with the user 400 by using this log-in name or the like.

Therefore, when an instruction of calling my page 230 is provided from the terminal unit 410 of the user 400, the control unit 200 reads my page information 231 of the user 400 from the memory and converts the IDs to various kinds of information and makes the HTML data of my page information 231 and transmits it to the terminal unit 410. Therefore, the terminal unit 410 displays the reference screen shown in FIG. 5A on the frame 217.

Here, it is also recommended that the setting and registration screen of the above-mentioned my page, as shown in FIG. 5C, displays a list of information items 234, which can be previously set, and that when the check column 235 of a desired information item of the various kinds of information items is checked and the registration button 233 is clicked, an ID corresponding to the specified information item is transmitted to the control unit 200 through the network 300. Therefore, similarly, the control unit 200 registers the ID as my page information 231 in the memory in connection with the user 400.

Furthermore, it is also recommended that the check column of each information item is provided in the information display page 210 for each category of the above-mentioned usual hierarchical structure and that the information item checked in this check column is added to the selected information item of my page 230.

Next, the operation of the image forming apparatus 100 of this embodiment will be described with reference to FIGS. 6 and 7.

Figure 6:
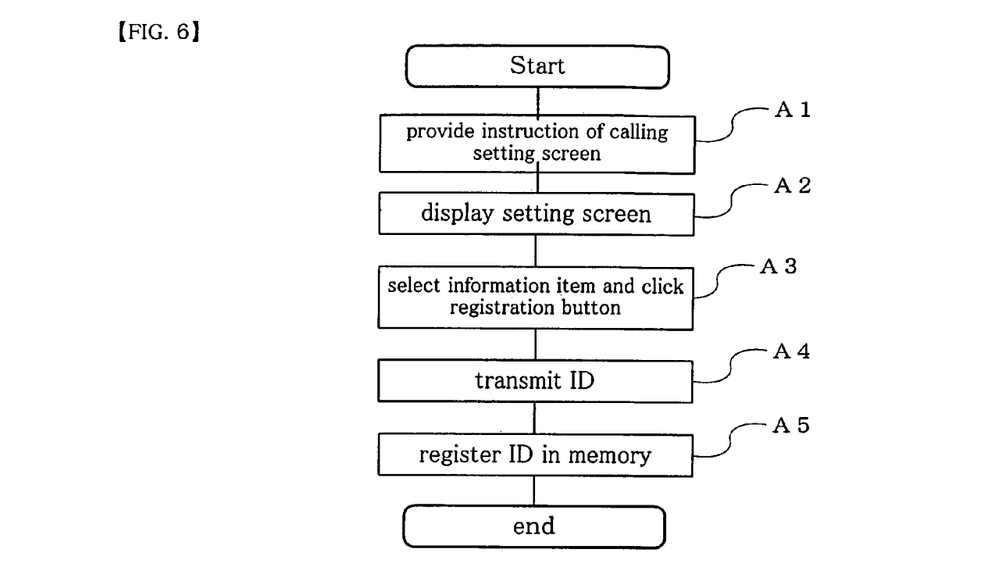
FIG. 6 is a flow chart showing the operation of setting my page in the image forming apparatus in FIG. 1.

FIG. 6 is a flow chart showing the operation of setting my page in the image forming apparatus 10.

In FIG. 6, first, at step A1, an instruction of calling the setting and registration screen of my page is transmitted to the control unit 200 through the network 300 by the operation of the terminal unit 410.

In this arrangement, the control unit 200, as shown at step A2, causes the terminal unit 410 to display the data of the setting and registration screen shown in FIG. 5B or FIG. 5C. When a desired information item is selected and the registration button 233 is clicked at step A3, the ID of the selected information item is transmitted from the terminal unit 410 to the control unit 200 through the network 300 at step A4.

And then, the control unit 200 registers the ID in the memory in connection with the user 400 at step A5.

In the manner described above, the operation of registering my page is finished.

Next, the operation of displaying my page in the image forming apparatus 10 will be described with reference to a flow chart shown in FIG. 7.

Figure 7:
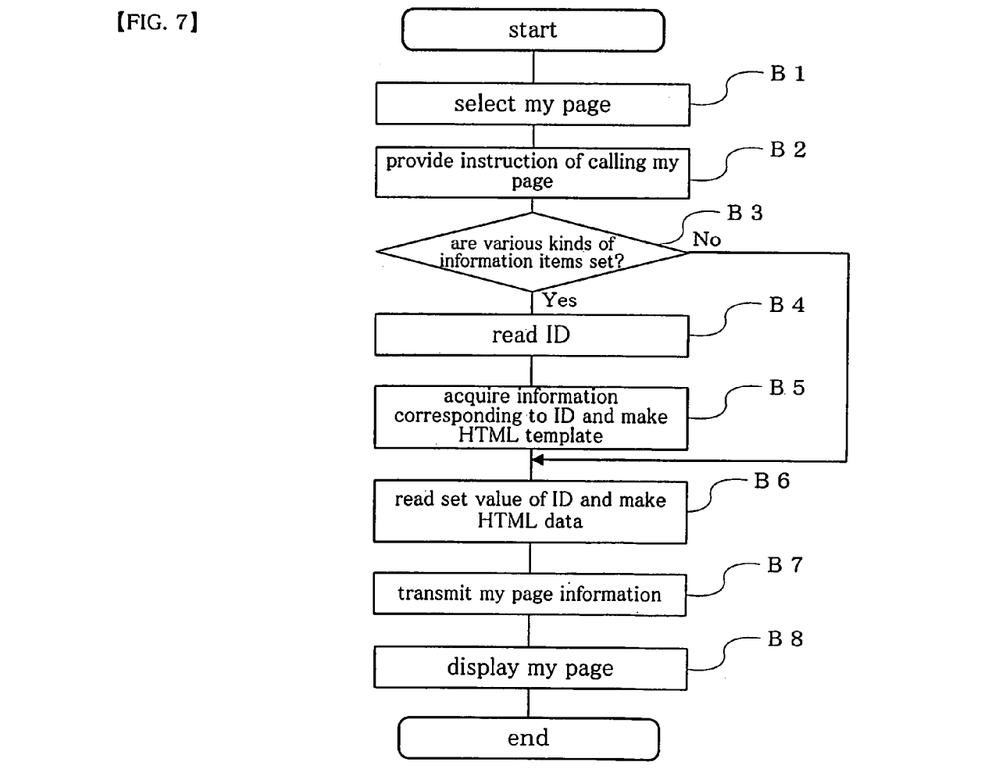
FIG. 7 is a flow chart showing the operation of displaying my page in the image forming apparatus in FIG. 1.

In FIG. 7, first, when the selection button 214a of my page in the frame 213 at the left end is clicked at step B1 by the operation of the terminal unit 410 in the state where information display page 210 shown in FIG. 5A is displayed, as shown at step B2, an instruction of calling my page is transmitted from the terminal unit 410 to the control unit 200 through the network 300.

In this arrangement, as shown at step B3, the control unit 200 determines whether or not each information item of my page corresponding to the user 400 is set.

Then, if each information item of my page is set, the control unit 200 reads the set IDs of respective information items at step B4. Then, at step B5, the control unit 200 acquires information corresponding to the respective IDs and converts the respective IDs to corresponding information to make HTML data. Then, at step B6, the control unit 200 reads the set values of the respective IDs from the image forming apparatus main unit 100 and adds these set values to the HTML data to complete the HTML data, that is, my page information 231.

Thereafter, as shown at step B7, the control unit 200 transmits this my page information 231 to the terminal unit 410 through the network 300.

In this arrangement, as shown at step B8, the terminal unit 410 displays my page 230 on the screen based on this my page information 231. And then, the user 400 can refer to the set values of the desired information items specified by my page 230 on one screen.

Here, if the information item of my page is not set at step B3, at step B6, the control unit 200 makes my page information 231 in which information item is blank.

In the manner described above, the operation of displaying my page is finished.

Second Embodiment

Next, a second embodiment of an image forming system and a method of displaying various kinds of information of an image forming apparatus of the present invention will be described.

In this second embodiment, an image forming apparatus is constructed in the nearly same manner as the image forming apparatus 10 shown in FIGS. 1 and 2 and is constructed in a different manner from the image forming apparatus 10 shown in FIGS. 1 and 2 in that the control unit 200 does not register the IDs of respective information items specified by my page relating to each user 400.

In this case, each time my page is displayed, the setting and registration screen of my page is displayed.

The setting and registration screen of my page at this time is constructed as shown in FIG. 5D. That is, the setting and registration screen is nearly similar to the setting and registration screen shown in FIG. 5B, but a transmission button 236 is displayed in place of the registration button 233 and when the transmission button 236 is clicked, an instruction of calling my page and a specified ID are transmitted to the control unit 200 through the network 300.

In this regard, the IDs of respective information items included in this my page may be stored as appropriate in the terminal unit 410 by the user when my page is set and registered and that when my page is displayed, a list of stored IDs of the respective information items may be attached to the input column of the above-mentioned setting and registration screen.

In this arrangement, even when the control unit 200 does not register my page information 231 relating to each user 400, it is possible to make my page information 231 for each user 400 and to transmit it to the terminal unit 410 of each user 400 through the network 300. Therefore, the limited capacity of the memory on the image forming apparatus side is not consumed to register my page information 231 for each user 400 but can be effectively used.

Next, the operation of the image forming apparatus according to this second embodiment will be described with reference to FIG. 8.

Figure 8:
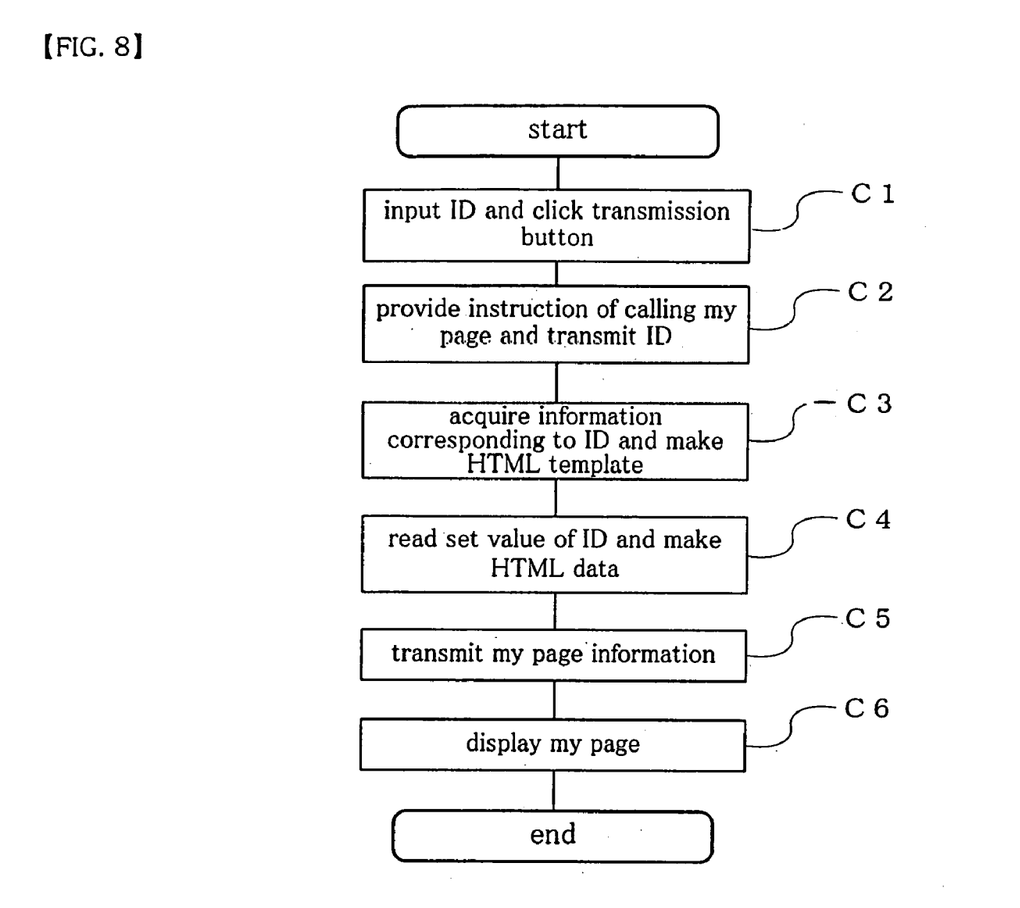
FIG. 8 is a flow chart showing the operation of displaying my page in a second embodiment of the image forming apparatus according to the present invention.

FIG. 8 is a flow chart showing the operation of displaying my page in the image forming apparatus.

In FIG. 8, first, when the IDs of desired information items are inputted to the input column and a transmission button 236 is clicked at step C1 by the operation of the terminal unit 410 in the state where information display page 210 shown in FIG. 5D is displayed, as shown at step C2, an instruction of calling my page and the IDs of respective information items included in my page are transmitted from the terminal unit 410 to the control unit 200 through the network 300.

Therefore, as shown at step C3, the control unit 200 acquires information corresponding to the respective IDs based on the IDs of the respective information items included in my page and converts the respective IDs to corresponding information to make an HTML template. Then, at step C4, the control unit 200 reads the set values of the respective IDs from the image forming apparatus main unit 100 and adds these set values to the above-mentioned HTML data to complete the HTML data, that is, my page information 231.

Thereafter, as shown at step C5, the control unit 200 transmits this my page information 231 to the terminal unit 410 through the network 300.

And then, as shown at step C6, the terminal 410 displays my page 230 on the screen based on this my page information 231. Thus, the user 400 can refer to the set values of the desired information items specified by my page 230 on one screen.

In the manner described above, the operation of displaying my page is finished.

Third Embodiment

Next, a third embodiment of an image forming system and a method of displaying various kinds of information of an image forming apparatus of the present invention will be described.

In this third embodiment, an image forming apparatus is constructed in the nearly same manner as the image forming system 10 according to the second embodiment, and is constructed in a different manner from the image forming system 10 shown in FIGS. 1 and 2 in that the control unit 200 does not register the IDs of respective information items specified by my page relating to each user 400.

Moreover, in this case, when the control unit 200 sets and registers my page, the control unit 200 makes the HTML template of my page and the HTML data based on the IDs of the information items of my page transmitted from the terminal unit 410 and then causes the terminal unit 410 to add cookie information relating to the respective information items included in my page to a HTTP request through the network 300.

Here, this cookie information is stored in the terminal unit 410.

In this arrangement, even if the control unit 200 does not register my page information 231 relating to each user 400 in the memory, the control unit 200 can read cookie information for each user 400 from his terminal unit 410 and acquires respective set information items and makes my page information 231.

Therefore, the limited capacity of the memory on the image forming apparatus side is not consumed to register my page information 231 for each user 400 but can be effectively used.

Moreover, the cookie information is stored in the terminal unit 410 of the user 400 but the user can perform various kinds of operations without being aware of this as if my page information 231 were stored on the image forming apparatus 10 side.

Next, the operation of the image forming apparatus 10 according to this second embodiment will be described with reference to FIGS. 9 and 10.

Figure 9:
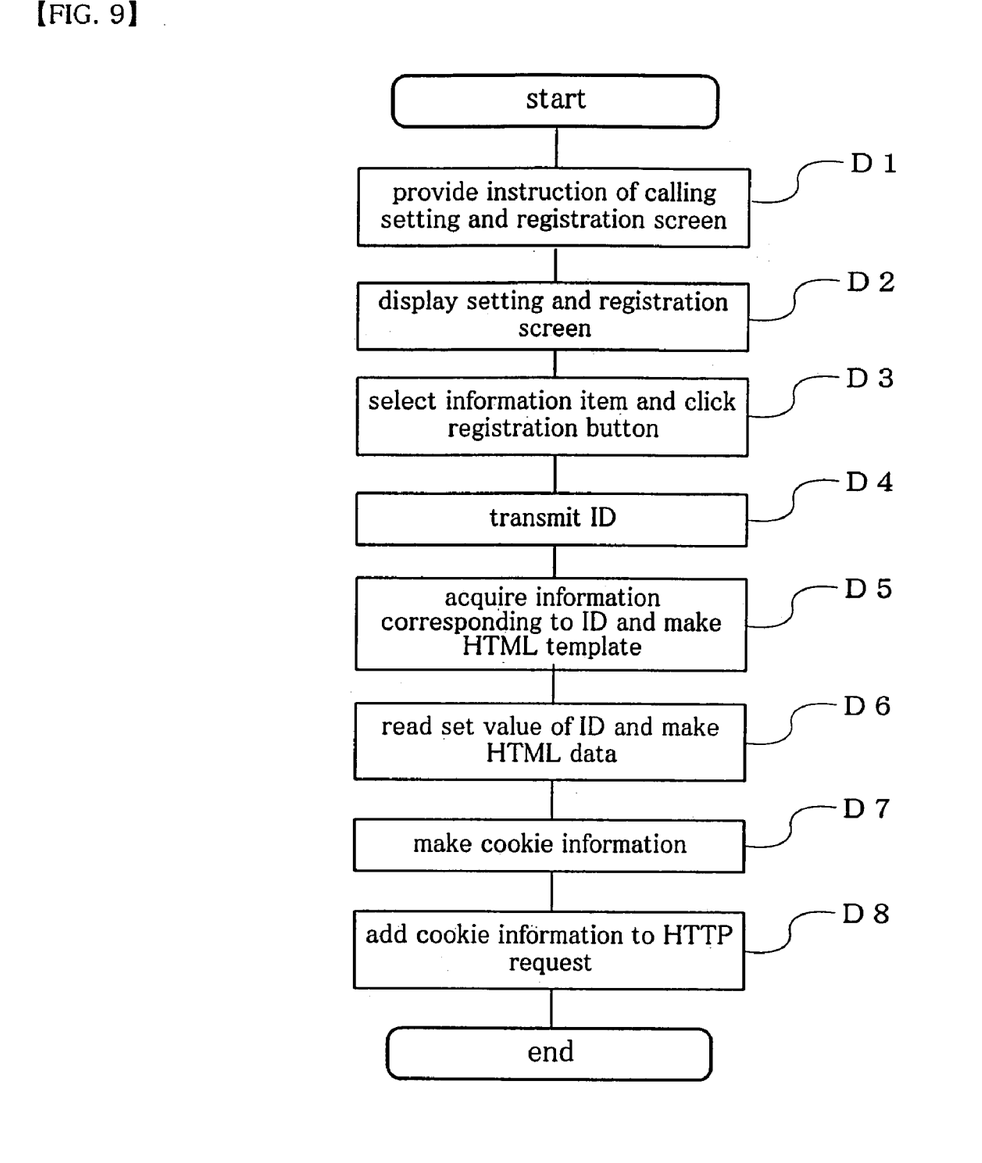
FIG. 9 is a flow chart showing the operation of setting my page in the second embodiment of the image forming apparatus according to the present invention.

FIG. 9 is a flow chart showing the operation of setting my page in the image forming apparatus 10.

In FIG. 9, first, at step D1, an instruction of calling the setting and registration screen of my page is transmitted to control unit 200 through the network 300 by the operation of the terminal unit 410.

In this arrangement, as shown at step D2, the control unit 200 causes the terminal unit 410 to display the setting and registration screen shown in FIG. 5B or FIG. 5C. When desired information items are selected and the registration button 233 is clicked at step D3, the IDs of the selected information items are transmitted from the terminal unit 410 to the control unit 200 through the network 300 at step D4.

And then, at step D5, the control unit 200 reads information corresponding to the respective IDs based on the IDs of the respective information items included in my page and converts the respective IDs to corresponding information to make an HTML template. Then, at step D6, the control unit 200 reads the set values of the respective IDs from the image forming apparatus main unit 100 and adds these set values to the above-mentioned HTML data to complete the HTML data, that is, my page information 231.

Thereafter, at step D7, the control unit 200 makes cookie information of the information items set in this my page information 231. Then, at step D8, the control unit 200 causes the terminal unit 410 to add the cookie information to the HTTP list.

In the manner described above, the operation of registering my page is finished.

Next, the operation of displaying my page in the image forming apparatus 10 will be described with reference to a flow chart in FIG. 10.

Figure 10:
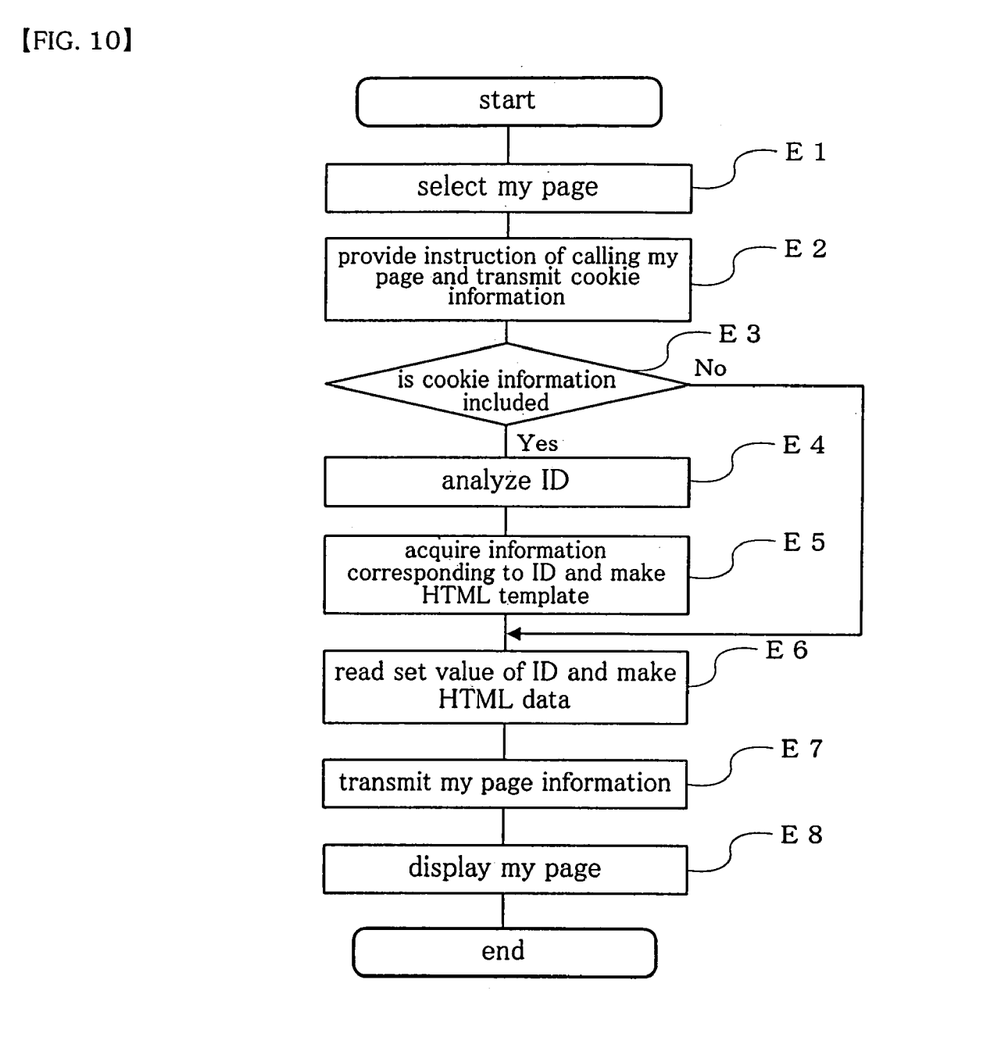
FIG. 10 is a flow chart showing the operation of displaying my page in the image forming apparatus in FIG. 9.

In FIG. 10, first, when the selection button 214a of my page in the frame 213 at the left end is clicked at step E1 by the operation of the terminal unit 410 in the state where the information display page 210 shown in FIG. 5A is displayed, as shown in step E2, an instruction of calling my page and the above-mentioned cookie information are transmitted from the terminal unit 410 to the control unit 200 through the network 300.

In this arrangement, as shown at step E3, the control unit 200 determines whether or not the instruction of calling my page includes the cookie information. If the instruction includes the cookie information, the control unit 200 analyzes the IDs of the respective information items included in my page from this cookie information at step E4. Then, at step E5, the control unit 200 acquires information corresponding to the respective IDs based on the IDs and converts the respective IDs to corresponding information to make an HTML template. Then, at step E6, the control unit 200 reads the set values of the respective IDs from the image forming apparatus main unit 100 and adds these set values to the above-mentioned HTML data to complete the HTML data, that is, my page information 231.

Thereafter, as shown at step E7, the control unit 200 transmits this my page information 231 to the terminal unit 410 through the network 300.

In this arrangement, as shown at step E8, the terminal 410 displays my page 230 on the screen based on this my page information 231. Thus, the user 400 can refer to the set values of the desired information items specified by my page 230 on one screen.

Here, if cookie information is not included in the instruction of calling my page at step E3, at step E6, the control unit 200 makes my page information 231 in which information item is blank.

In the manner described above, the operation of displaying my page is finished.

[Program for Displaying Various Kinds of Information]

Next, a program for displaying various kinds of information will be described.

The function of displaying various kinds of information of a computer (image forming apparatus and terminal unit) (function of performing a method of displaying various kinds of information of an image forming apparatus) in the above-mentioned respective embodiments are realized by a program for displaying various kinds of information stored in storage unit (for example, ROM).

When the program for displaying various kinds of information is read by the control unit (CPU and the like) of a computer, the program transmits an instruction to respective constituent units to cause the constituent units to perform specified processing, for example, the processing of making my page information, the processing of transmitting my page information, the processing of displaying my page information, and the like.

In this arrangement, the program or software for displaying various kinds of information which is software and the respective constituent units of the computer (image forming apparatus and terminal unit) which is hardware resources work in cooperation with each other to realize the functions of displaying various kinds of information.

In this regard, the program for displaying various kinds of information for realizing the functions of displaying various kinds of information can be stored not only in the ROM, the hard disk, and the like of the computer but also in a recording medium that can be read by the computer, for example, an external storage device and a portable recording medium.

The external storage device means an additional memory unit having a storage medium such as a CD-ROM built therein and externally connected to the image forming apparatus and the terminal unit, whereas the portable recording medium is a recording medium that can be mounted in a recording medium driving unit (drive unit) and is portable, for example, a flexible disk, a memory card, and a magneto optical disk.

Then, a program recorded in the recording medium is loaded into the RAM and the like of the computer and is executed by the CPU (control unit). With this execution of the program, the functions of the image forming apparatus and the terminal unit of the above-mentioned embodiment can be realized.

Moreover, when the program for displaying various kinds of information is loaded by the computer, the program for displaying various kinds of information stored in the other computer can be downloaded in the RAM and the external storage device of the computer by the use of a communication line. This downloaded program for displaying various kinds of information can be executed by the CPU to realize the functions of displaying various kinds of information of the image forming apparatus and the terminal unit of this embodiment.

The preferred embodiments of the image forming apparatus, the method of displaying various kinds of information of the image forming apparatus, and the program for displaying various kinds of information of the image forming apparatus in accordance with the present invention have been described up to this point. However, it is not intended to limit the image forming apparatus, the method of displaying various kinds of information of the image forming apparatus, and the program for displaying various kinds of information of the image forming apparatus according to the present invention only to the above-mentioned embodiments but, needless to say, various modifications may be made within the spirit and scope of the present invention.

For example, in the above-mentioned embodiments, when the control unit 200 makes my page information 231, the control unit 200 makes it in the HTML format. However, it is not intended to limit the format to the HTML format but the control unit 200 may make my page information 231 in a format, which can be browsed by a browser, such as XML format.

Moreover, in the above-mentioned embodiments, the above-mentioned IDs relating to the respective information items in my page information 231 are determined only in correspondence to respective information items. However, it is not intended to limit the IDs to this but the IDs may include setting contents such as the display position, size of character, and color of character of each information item.

In this arrangement, each user 400 can freely construct my page of format, design, and color of his preference.

The present invention is an invention relating to a system for causing a terminal unit to display various kinds of information of an image forming apparatus and hence can be used to an apparatus and a unit having a function for displaying various kinds of information relating to an image forming apparatus.

What is claimed is:

1. An image forming system capable of referring to and setting various kinds of information relating to an operation of an image forming apparatus by a terminal unit connected to the image forming apparatus through a network, comprising:

an information display page displaying information items corresponding to the various kinds of information, wherein the information items displayed in the information display page (my page) are specific to a user, and a setting on at least one of the information items of the my page is changeable at the terminal unit, wherein the information items are selected by the user to be displayed at a specified position in the my page, or selected by the user to not be displayed in the my page.

2. The image forming system according to claim 1, wherein a format including respective information items relating to my page information for constructing the my page and their display positions can be arbitrarily changed by the terminal unit.

3. The image forming system according to claim 1 or 2, wherein individual pieces of the various kinds of information relating to an operation of the image forming apparatus are given IDs, wherein the my page information is constructed of a template having IDs corresponding to respective information items built therein and data as set values corresponding to the respective IDs, and wherein when the my page is called from the terminal unit, a control unit of the image forming apparatus converts the respective IDs of the template to corresponding character information and transmits the converted character information and data corresponding to the respective IDs as my page information to the terminal unit through a network.

4. The image forming system according to claim 3, wherein when a setting change is made on an information item and an ID corresponding to the information item having a setting change made thereon and a set value thereof are transmitted from the terminal unit to the image forming apparatus through the network, the control unit makes a setting change on a corresponding piece of various kinds of information based on this set value.

5. The image forming system according to claim 1 or claim 2, wherein the my page information is in HTML or XML.

6. The image forming system according to claim 2, wherein the format of the my page information is registered in the image forming apparatus.

* * * * *